D. L. LEVEY.
RODENT EXTERMINATOR.
APPLICATION FILED APR. 8, 1908.
925,584.
Patented June 22, 1909.
2 SHEETS—SHEET 1.
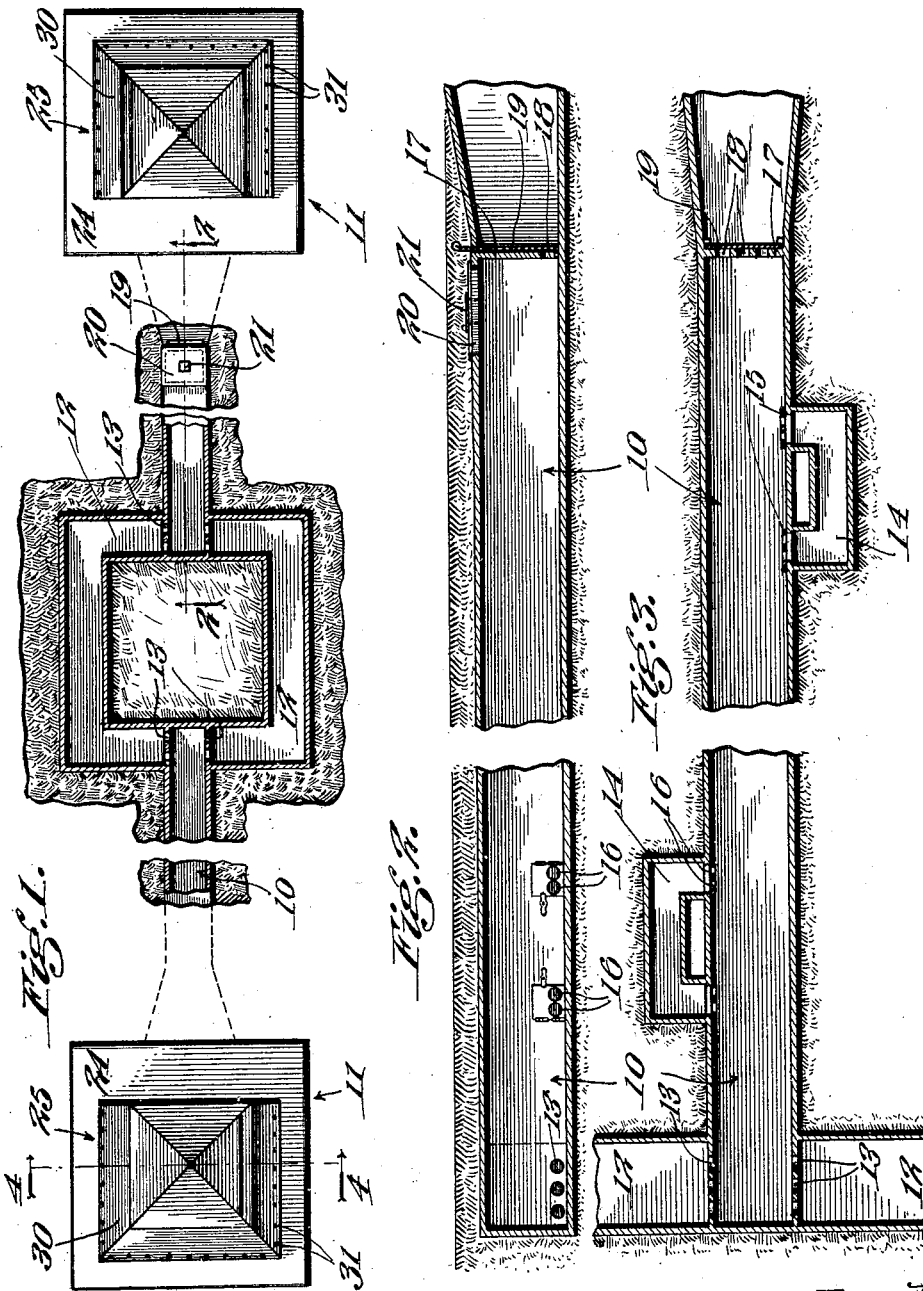
Inventor:
David L. Levey, D. L. LEVEY.
RODENT EXTERMINATOR.
APPLICATION FILED APR. 8, 1908.
925,584.
Patented June 22, 1909.
2 SHEETS—SHEET 2.
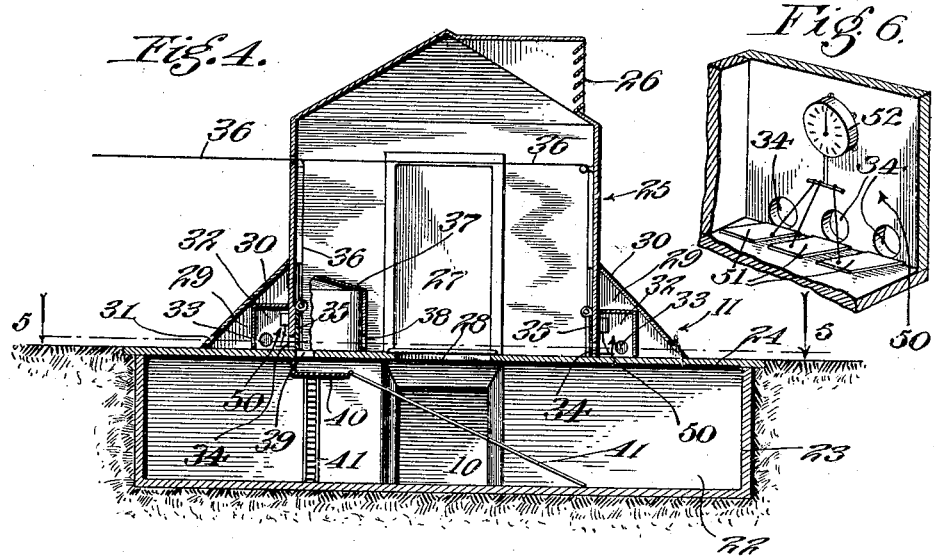
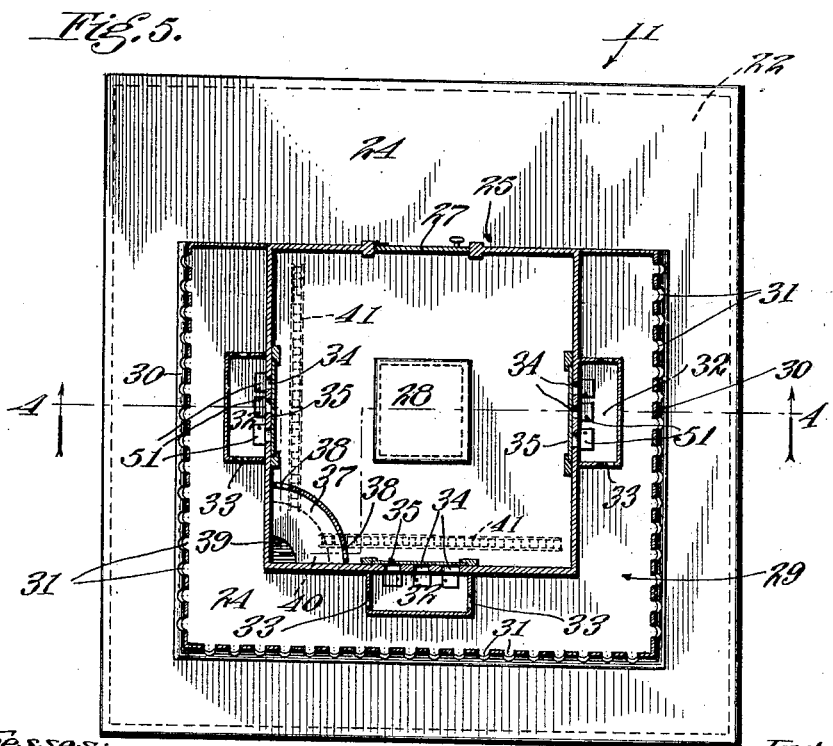

UNITED STATES PATENT OFFICE.

DAVID L. LEVEY, OF CORONADO BEACH, CALIFORNIA.

RODENT-EXTERMINATOR.

No. 925,584.  Specification of Letters Patent.  Patented June 22, 1909.

Application filed April 8, 1908. Serial No. 425,798.

*To all whom it may concern:*

Be it known that I, DAVID L. LEVEY, a citizen of the United States, residing at Coronado Beach, in the county of San Diego and State of California, have invented new and useful Improvements in Rodent-Exterminators, of which the following is a specification.

Heretofore in the construction of rodent exterminators such devices as traps for killing the rodents have been used. In dealing with rats it is seldom that one is caught in a trap as they are wary animals and will not tamper with anything dangerous to themselves nor will they enter through an opening which they cannot return through.

The prime object of my invention is to provide an exterminator into which the rodents will enter without any suspicion of being caught therein, and to make the interior of the exterminator of such a character that they will take up their permanent home therein and draw other rodents to the same place.

With this end in view my invention consists of an elongated chamber which may be placed in any position, such as an underground tunnel. This chamber is provided with many compartments and contracted passage ways through which the rodents may run and find for themselves permanent homes. At one or both ends of this chamber is an enlarged chamber through which the rodents enter the tunnel. The entrances to these end chambers are through numerous contracted openings so that the rodent feels himself to be entirely safe after he has entered. These chambers are also so constructed that the rodents within the exterminator may be fed and thus induced to remain, while others are induced to enter.

I accomplish the above by means of the device described herein and illustrated in the accompanying drawings, in which:—

Figure 1,—is a contracted plan view of my improved exterminator, with parts in horizontal section. Fig. 2,—is an enlarged vertical section taken on line 2—2 of Fig. 1. Fig. 3,—is a sectional plan of the parts shown in Fig. 2. Fig. 4,—is a sectional elevation of one of the end chambers taken on line 4—4 of Fig. 5. Fig. 5,—is a sectional plan of the same taken on line 5—5 of Fig. 4. Fig. 6,—is a perspective detail showing one of the registering devices.

In the accompanying illustrations the exterminator is shown as being formed or placed under ground, although, as hereinafter stated, it may be placed in other positions and accomplish its purpose with efficiency. In the form illustrated, the exterminator consists essentially of an elongated tunnel 10 provided with enlarged chambers 11 at one or each of its ends. This tunnel may be faced with any suitable retaining material such as wood or cement, cement being preferable for the floor. At its center, or at any desirable point, or points, along its length, the tunnel is provided with two passages 12 which divide from each other and form separate and distinct passage ways between two points of the tunnel. In the illustration these passage ways form a general square but it is obvious that they can be made in any suitable configuration. These passage ways are connected to the main tunnel by a number of contracted openings 13, which are of just sufficient size to allow the passage of a rodent therethrough and not of any other larger animal.

Along the sides of the tunnel are arranged a plurality of rectangular passage ways 14 which are provided with hinged door entrances 15 to the tunnel. These doors are for the purpose of opening up and cleaning the passage ways, rodent entrances 16 being provided therein as the doors are normally closed. These passage ways may be of any desirable number and form sequestered nesting places for the rodents where they will not be molested by the rodents passing through the tunnel. At each end of the tunnel is a wall 17 provided with rodent entrances 18 which are normally open and adapted to be closed by a gate 19. Adjacent this gate is a trap door 20 through which entrance may be effected to the tunnel, the trap door being provided with a small hand hole 21 for investigations of the tunnel with a light. Beyond gate 19 the tunnel is immediately connected to a chamber 11. This chamber consists, in the adaptation of the exterminator illustrated in the drawings, of a pit 22 faced as at 23 with wood or cement as desired and covered by a floor 24. Mounted upon floor 24 is a small block house 25 of a generally square configuration and provided with ventilating openings 26 at its top. A door 27 is provided for entrance to the block house and a trap door 28 in the center of floor 24 affords entrance means to the pit.

Extending around three sides of the block house is a compartment 29 formed between floor 24 and the vertical walls of the house by a sloping roof 30. This roof is provided with a plurality of rodent entrances 31 near its bottom of just sufficient size for the passage of rodents therethrough. Located in the center of each of the three sides of the house is a small box 32 having rodent entrances 33 at each of its ends. In the walls of the house are entrances 34 opening directly into box 32, these entrances being controlled by gates 35 operable by means of cords 36 from any convenient exterior point. In one corner of the floor of the block house is a small inclosed compartment 37 provided with entrances 38 from the interior of the house. In the corner of the floor thus inclosed is an opening 39 leading to a platform 40 immediately below, from which platform ladders 41 lead to the floor of pit 22.

In the operation of the exterminator the various gate controlled passages are normally open allowing the rodents to pass freely into and out of the exterminator and through all parts thereof. To enter the exterminator the rodents must first pass through openings 31, then through openings 33 into boxes 32 and through openings 34 into the block house. They next pass through openings 38 and 39 onto platform 40 whence they may climb down into the pit. From the pit they may enter the tunnel through the openings 18. In the tunnel there are many by-passes and contracted openings through which the rodents may pass and make their homes. In the construction illustrated the tunnel is buried far enough beneath the surface of the ground to insure a perfectly dark and quiet place where the rodents may live. It will be seen that the particular configuration and arrangement of the various passage ways and openings and compartments is not of much importance, the prime feature of this invention being to provide the compartments so that the rodents will make their homes therein and to provide a large number of contracted openings through which the rodents must pass and believe themselves to be perfectly safe from intrusion by animals which might destroy them.

From time to time the rodents are fed through trap door 28 in pit 22 so that a further inducement is offered them to remain in the exterminator. When a sufficient number of rodents have entered the exterminator the various gates are closed and all exit from the exterminator thereby cut off. Gas is then fed into the tunnel and the pits from any convenient source of supply, ordinary illuminating gas being a very efficient medium. This gas is preferably fed in at one end only of the exterminator, a convenient point for placing the hose or pipe within the tunnel being at hand hole 21. As the gas fills one end of the tunnel the rodents all move to the other end and there remain until sufficient gas has accumulated to asphyxiate them. Being all accumulated in one end of the exterminator they are then easily removed through trap door 20.

It is obvious that an exterminator of this form may be placed in positions other than under ground. When placed under ground the two ends may be located in any convenient positions where the rodents are numerous and most likely to enter the exterminator in large numbers. Thus the two ends may be located in the basements of separate buildings and the tunnel placed under ground between the two buildings. In other locations the tunnels may be placed entirely above ground as is the case when the exterminator is placed wholly in one building. Here the tunnel may be built and placed around the walls or floors of the building with the ends at convenient points. On board ship the tunnels are placed around the outside of the hull. Thus it will be seen that the exterminator may be placed in any desirable position, the essential points of its construction remaining the same.

In Fig. 6, I have illustrated a registering device 50 to keep count of the number of rodents entering the exterminator. These registers consist of a platform 51 in front of each of passages 34 connected with a registry device 52, so that each time a rodent passes over a platform and depresses it, the registry device records one number.

Having described my invention what I claim as new and desire to secure by Letters Patent is:—

A rodent exterminator, comprising an elongated nesting chamber having narrow passage ways therein, a feeding chamber, a block house covering said feeding chamber, a wall of said block house having entrance holes therein, a slanting roof attached to said wall, a partition intermediate said roof and said wall, said roof and said partition also having entrance holes, said entrance holes being so arranged as to exclude light from said block house.

In witness that I claim the foregoing I have hereunto subscribed my name this 30 day of Mch., 1908.

DAVID L. LEVEY.

Witnesses:
J. H. JACKSON,
E. G. SYKES.